W. P. McCOMBS.
TRAP.
APPLICATION FILED MAY 11, 1911.

1,012,400.

Patented Dec. 19, 1911.
2 SHEETS—SHEET 1.

Witnesses
W. H. Taylor.
J. E. Burch.

Inventor
William P. McCombs

By Chandler & Chandler
Attorneys

W. P. McCOMBS.
TRAP.
APPLICATION FILED MAY 11, 1911.

1,012,400.

Patented Dec. 19, 1911.
2 SHEETS—SHEET 2.

Witnesses
W. H. Tyler
J. E. Burch

Inventor
William P. McCombs,
By
Attorneys

UNITED STATES PATENT OFFICE.

WILLIAM P. McCOMBS, OF SHANNON, ILLINOIS.

TRAP.

1,012,400.  Specification of Letters Patent.  Patented Dec. 19, 1911.

Application filed May 11, 1911. Serial No. 626,498.

*To all whom it may concern:*

Be it known that I, WILLIAM P. McCOMBS, a citizen of the United States, residing at Shannon, in the county of Carroll, State of Illinois, have invented certain new and useful Improvements in Traps; and I do hereby declare the following to be a full, clear, and exact description of the invention, such as will enable others skilled in the art to which it appertains to make and use the same.

This invention relates to traps and more particularly to those commonly termed rat traps and the object of the invention is to provide a trap of the self-set and ever-set type of novel construction and which will efficiently serve to catch the rodent.

The invention generically consists of a cylindrical body having a top closure tiltable in one direction and an extension secured inwardly of the body and extending partly into the body beyond the movable side of the top and beyond the axis thereof so as to efficiently serve to discharge the rodent into the body and a further object consists in forming these parts in a novel manner.

Another object of the invention is to provide a novel bait receptacle which is carried by the extension and also to provide means for limiting both the downward movement of the tilting side of the top and the movement of the other side when returned to operative position.

With these and other objects in view the invention consists of certain other combinations and arrangements of parts as will be hereinafter more fully described in detail and claimed, it being a still further object to provide a device which will not be likely to get out of working order.

Figure 1:
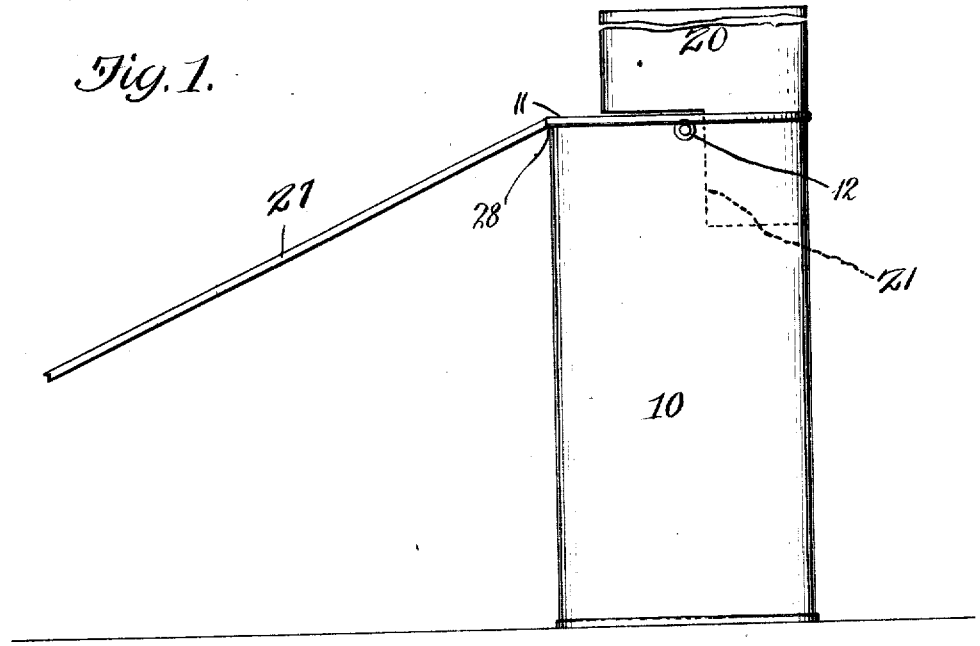
Figure 3:
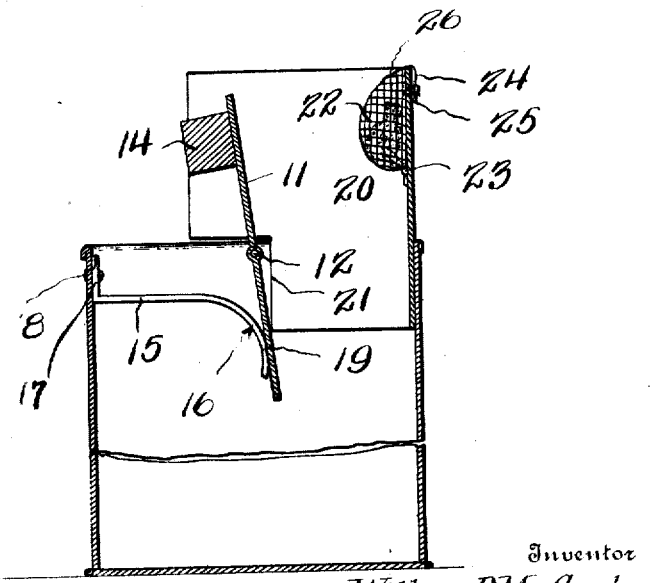
Figure 2:
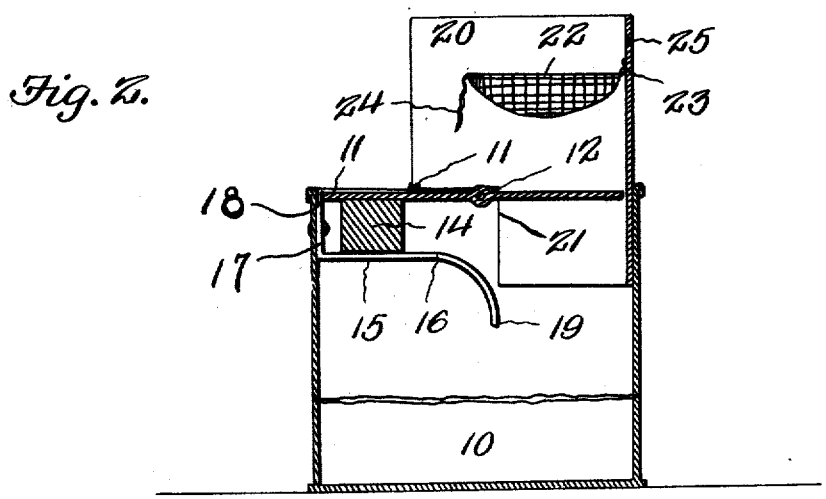
Figure 4:
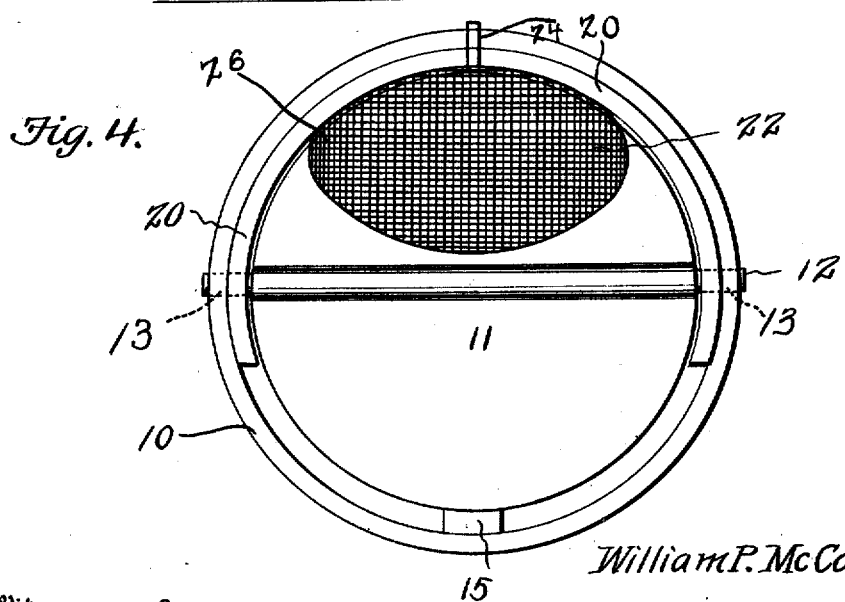

In the drawings:—Figure 1 is a side elevation of my improved trap with the approach in position for use. Fig. 2 is a central vertical sectional view thereof with the approach removed showing the bait receptacle in an extended position for receiving the bait, the tiltable top of the body or receptacle of the trap being shown in a horizontal position. Fig. 3 is a similar view but showing the bait receptacle in a closed position with the bait therein and also showing the top in a tilted position to precipitate the animal into the receptacle. Fig. 4 is a top plan view of the device.

Referring to the drawings in detail, there is shown my improved trap which comprises a receptacle or body 10 which is preferably cylindrical in shape and which is provided with a closed bottom and an open upper end, the body being formed of sheet metal and being thoroughly water-proof at its joint connections. Pivotally secured upon and extending through the surrounding wall of the body at opposite points thereof is a tiltable top 11 in the form of a circular disk, said top being mounted upon a transverse pivot pin 12 disposed outwardly of the center of its fulcrum point and having its ends extending through the body as shown at 13. Besides, the side of the top which is of greatest eccentricity sufficing to return the top to a horizontal position to close the body, this side is also provided with a weight 14 upon its undersurface and adjacent its outer edge centrally between its pivoted ends so as to further assist in returning the same from the tilted position shown in Fig. 3 of the drawings to the position shown in Fig. 2 of the drawings and said weight is adapted to contact with the horizontal portion 15 of a spring arm 16 which has its outer end disposed in a vertical position as shown at 17 by bending the same and secured to the body of the trap. This end 17 of the spring arm also terminates below the upper edge of the body to form a stop shoulder 18 adapted to contact with the ledge of the top outwardly of the weight 14 and thus further serve to limit its downward movement and to hold said top in a horizontal position.

As will be clearly seen in Figs. 2 and 3 of the drawings, the spring arm 16 extends downwardly in a partially inclined position to a point beyond the center of the body and pivot point of the top and terminates in a downturned end 19 adapted to contact with the downwardly movable side of the top closure so as to limit the movement thereof to a vertical position when the top is tilted by the weight of the animal and said arm is of sufficient resiliency to assist in the turning of the top to a horizontal position when returned by the action of its weighted side. The body of the trap is also provided with an extension 20 which has a reduced lower portion formed by incisions 21 in its lower corners, whereby said reduced portion may be rigidly secured to the surrounding wall inwardly of the body between the pivot points of the top and providing an upwardly extending portion having its axial sides continuing from the downwardly movable side of the top in both directions beyond the axis of the top closure, thereby positively preventing any possibility of escape of the animal when once upon the top. This extension or guard 20 is therefore provided within and outwardly of the body of the trap and serves to efficiently discharge the animal into the body when precipitated from the tilting side of the top.

In order to provide for supporting the bait, I provide a spring wire netting 22 which has one edge thereof secured to the central portion of the extension upon its inner face as shown at 23 and is provided at its opposite edge with suitable means for removably connecting it to the upper edge of the guard, such as by means of a tape 24 adapted to engage through an opening 25 in the guard. This secured edge of the net forming the bait receptacle is also bent inwardly as shown at 26 and its end portions are closed by the guard which is disposed in closing position relative thereto and said receptacle is especially adapted when in use to contain a young chicken as a bait, although it is obvious that any other form of bait may be used. In practice, an approach 27 may be also used whereby the animal may approach the tiltable top section, said approach being provided with a concaved upper end 28 adapted to engage the body of the trap and being also adapted for containing any advertising matter or directions for the use of the trap. The receptacle or body is filled with water or other liquid and when the animal attempts to reach for the bait, the top closure will tilt and precipitate the animal into the receptacle and liquid contained therein and the animal will thereby be drowned. The top will then be returned to a horizontal position by means of its weighted end and the spring arm 16 will aid in a similar operation.

From the advantages above set forth in connection with the accompanying drawings, it will be readily seen that I have provided an improved trap structure in which the many undesirable effects of a penetrating trap is avoided and it will be further evident that besides obtaining a positive catch, the caught animals may be readily removed from the trap. The simplicity of the structure aside from its novel advantages and features of construction render the trap very economical in the manufacture.

I claim:—

1. A trap comprising a cylindrical body having a top closure tiltable in one direction, an extension formed separate of the body and secured to its surrounding wall interiorly thereof and extending above the downwardly tiltable side of the top closure upon one side of its pivot point, a wire mesh bait receptacle secured at its lower portion to the interior wall of the guard formed by the extension and adapted to fold upwardly in closed relation thereto at its open side, means for securing the upper end of the receptacle to the guard and means for limiting the downward movement of the top and assisting in its return to a closed position.

2. A trap comprising a cylindrical body, a tiltable top pivoted off of the fulcrum center of the body and in the sides thereof, an extension projecting upwardly from the body beyond the area of the pivot points and having a reduced lower portion fitting therebetween and secured to the inner wall and upper portion of the body, a spring wire net bait receptacle supported at the upper and central portion of the extension, a weight carried by the upwardly movable portion of the top upon its under surface and inwardly of its edge portion and a spring arm having a vertical portion secured to the inner face of the body spaced from its upper edge to contact with the top outwardly of the weight, and limit the movement of the top to a closed position, said spring also having a curved depending portion at its inner end limiting the downward movement of the top and serving to return the same to a closed position after the animal is precipitated.

In testimony whereof, I affix my signature, in presence of two witnesses.

WILLIAM P. McCOMBS.

Witnesses:
John L. Byers,
J. R. Meyers.